(12) United States Patent
Li et al.

(10) Patent No.: US 10,979,723 B2
(45) Date of Patent: Apr. 13, 2021

(54) IMAGE PROCESSING METHOD AND IMAGE PROCESSING DEVICE

(71) Applicant: GlenFlyTechnology Co., Ltd., Shanghai (CN)

(72) Inventors: Kuan Li, Shanghai (CN); Heng Que, Shanghai (CN); Yuanfeng Wang, Shanghai (CN); Jinmin Zhang, Shanghai (CN)

(73) Assignee: GlenFlyTechnology Co., Ltd., Shanghai (CN)

( * ) Notice: Subject to any disclaimer, the term of this patent is extended or adjusted under 35 U.S.C. 154(b) by 30 days.

(21) Appl. No.: 16/432,895

(22) Filed: Jun. 5, 2019

(65) Prior Publication Data
US 2020/0366907 A1 Nov. 19, 2020

(30) Foreign Application Priority Data
May 13, 2019 (CN) .......................... 201910393517.4

(51) Int. Cl.
*H04N 19/174* (2014.01)
*H04N 19/176* (2014.01)

(52) U.S. Cl.
CPC .................................. *H04N 19/176* (2014.11)

(58) Field of Classification Search
CPC .................................................... H04N 19/176
See application file for complete search history.

(56) References Cited

U.S. PATENT DOCUMENTS

| | | | | |
|---|---|---|---|---|
| 6,950,471 B2 * | 9/2005 | Kishi | ............. | H04N 21/234327 375/240.19 |
| 8,750,607 B2 * | 6/2014 | Asano | ....................... | G06T 9/00 382/166 |
| 10,311,324 B1 * | 6/2019 | Kim | ..................... | G06K 9/4604 |
| 2006/0018556 A1 * | 1/2006 | Ghildiyal | ............ | H03M 7/3084 382/232 |
| 2009/0067709 A1 * | 3/2009 | Gross | ....................... | G06T 7/11 382/166 |

(Continued)

FOREIGN PATENT DOCUMENTS

| | | |
|---|---|---|
| CN | 102096636 | 6/2011 |
| CN | 106331712 | 1/2017 |

OTHER PUBLICATIONS

"Office Action of China Counterpart Application", dated Dec. 3, 2020, p. 1-p. 10.

*Primary Examiner* — Cindy Trandai
(74) *Attorney, Agent, or Firm* — JCIPRNET

(57) ABSTRACT

The disclosure provides an image processing method and an image processing device. The method includes: obtaining a specific block from a specific block group of a specific image, wherein the specific block group includes blocks; compressing the specific block as a specific stream based on a predetermined compression ratio; when a length of the specific stream is not shorter than a predetermined block length, dividing the specific stream into a first sub-stream and a second sub-stream; storing the first sub-stream into a specific private block of a plurality of private blocks; finding an idle chunk out of shared chunks shared by the blocks; if the idle chunk is enough for storing the second sub-stream, storing the second sub-stream into the idle chunk and using a chunk usage information to record a number of the idle chunk.

24 Claims, 4 Drawing Sheets

(56) References Cited

U.S. PATENT DOCUMENTS

| | | | | |
|---|---|---|---|---|
| 2009/0220161 | A1* | 9/2009 | Suzuki | H04N 19/124 382/233 |
| 2011/0123127 | A1* | 5/2011 | Mima | H04N 19/46 382/239 |
| 2012/0233417 | A1* | 9/2012 | Kalach | G06F 3/0641 711/162 |
| 2013/0022115 | A1* | 1/2013 | Oh | H04N 19/176 375/240.12 |
| 2013/0163890 | A1* | 6/2013 | Hosaka | H04N 19/91 382/233 |
| 2014/0169480 | A1* | 6/2014 | Lachine | H04N 19/176 375/240.23 |
| 2014/0314329 | A1* | 10/2014 | Reznic | H04N 19/625 382/233 |
| 2015/0071559 | A1* | 3/2015 | Nakayama | H04N 19/154 382/239 |
| 2015/0201196 | A1* | 7/2015 | Cheong | H04N 19/146 375/240.03 |
| 2016/0086374 | A1* | 3/2016 | Farrell | G06T 9/00 345/422 |
| 2016/0155429 | A1* | 6/2016 | Matsui | G06T 1/60 345/555 |
| 2017/0017407 | A1* | 1/2017 | Wei | G06F 3/0641 |
| 2018/0026654 | A1* | 1/2018 | Gopal | G06F 3/0679 341/51 |
| 2018/0307598 | A1* | 10/2018 | Fischer | G06F 12/0253 |
| 2019/0124395 | A1* | 4/2019 | Lin | G06F 12/1009 |
| 2019/0132586 | A1* | 5/2019 | Nagumo | H03M 7/3062 |
| 2020/0084442 | A1* | 3/2020 | Bauer | H04N 19/115 |
| 2020/0092556 | A1* | 3/2020 | Coelho | H04N 19/147 |
| 2020/0126263 | A1* | 4/2020 | Dinh | G06K 9/6256 |
| 2020/0252652 | A1* | 8/2020 | Shiraishi | H04N 19/184 |

* cited by examiner

IMAGE PROCESSING METHOD AND IMAGE PROCESSING DEVICE

CROSS-REFERENCE TO RELATED APPLICATION

This application claims the priority benefit of China application serial no. 201910393517.4, filed on May 13, 2019. The entirety of the above-mentioned patent application is hereby incorporated by reference herein and made a part of this specification.

BACKGROUND OF THE INVENTION

1. Field of the Invention

The present disclosure relates to an image processing method and an image processing device, and more particularly to an image processing method and an image processing device that allow blocks of a block group in an image to share a storage space.

2. Description of Related Art

In the field of image compression, the compression result of the compression algorithm mainly depends on the pixel information in the image. When two equal-sized images are compressed using the same compression algorithm, different results of lengths are produced due to different pixel information. In today's image compression field, it is often desirable to compress an image at a compression ratio of 2:1 or 3:1. That is, an image must be stored in a compression space of ½ or ⅓ of the original size after compression.

In addition, in the scene where the image is required to be partially compressed and partially decompressed, in addition to the compression ratio, the image needs to be compressed at a finer granularity. Specifically, suppose an image has a size of 100×80 (that is, a total of 8000 pixels), and it is has to be compressed by using 16 pixels (called a block) as the minimum granularity. The image will be divided into 500 blocks. Moreover, these blocks are compressed into separate streams. After that, the 500 streams will be stored in the compression space.

If it is required to compress the image in a compression ratio of 2:1, the compressed 500 streams must be placed in a compression space of ½ the size of the original image. Under the above assumption, the size of this compression space is 96000 bits, that is, (½×100×80×24), wherein the number 24 is the sum of the number of bits used to represent the bits of red (R), green (G), and blue (B) of a single pixel (R, G, and B individually correspond to one byte).

In the conventional practice, the above 96000-bit compression space is first divided into 500 equal parts (each 192 bits), and each part is used to store a stream generated after one block is compressed. However, as mentioned previously, the length of the stream generated after compression of each block will result in different stream lengths depending on the pixel information in the block.

Please refer to FIG. 1A, which is a schematic diagram of compressing two blocks in an image to generate different streams according to a conventional method. In the image 100 of FIG. 1A, the flower 102 is almost monochromatic (e.g., red), thus causing the block 102a therein to have a shorter stream length (e.g., 143 bits) after being compressed. On the other hand, since the color range of the spiked plant 104 is large, the length of the stream generated by the block 104a after lossless compression is long (for example, 206 bits). In this case, if the same size (i.e., 192 bits) space is allocated for each block, the stream corresponding to the block 104a will not be completely stored.

Please refer to FIG. 1B, which is a schematic diagram of storing a stream to a compression space according to FIG. 1A. In FIG. 1B, the stream 102b corresponding to the block 102a (the length of which is, for example, 143 bits) can be completely stored, but the stream 104b corresponding to the block 104a (the length of which is, for example, 206 bits) is longer than 192 bits, and hence cannot be completely stored.

SUMMARY OF THE INVENTION

In view of this, the present disclosure provides an image processing method and an image processing device, which can be used to solve the above technical problems.

The present disclosure provides an image processing method, comprising: obtaining a specific block from a specific block group of a specific image, wherein the specific block group includes a plurality of blocks; and compressing the specific block based on a predetermined compression ratio a specific stream; when the length of the specific stream is not less than a predetermined block length, the specific stream is divided into a first sub-stream and a second sub-stream, wherein the length of the first sub-stream Same as the predetermined block length; storing the first sub-stream to a specific one of the plurality of private blocks; and finding at least one idle chunk from the plurality of shared chunks, wherein the aforementioned shared chunk is by the foregoing Block sharing; if at least one idle chunk is sufficient to store the second sub-stream, storing the second sub-stream into at least one idle chunk and using the first chunk to use the information record corresponding to the specific private block The number of at least one idle chunk.

The disclosure provides an image processing device comprising a storage circuit and a processor. The storage circuit stores a plurality of modules. The processor is coupled to the storage circuit and accesses the foregoing module to perform the steps of: obtaining a specific block from a specific block group of a specific image, wherein the specific block group includes a plurality of blocks; based on a predetermined compression The ratio compresses the specific block into a specific stream; when the length of the specific stream is not less than a predetermined block length, the specific stream is divided into a first sub-stream and a second sub-stream, where The length of a sub-stream is the same as the length of the predetermined block; storing the first sub-stream into a specific private block of the plurality of private blocks; and finding at least one idle chunk from the plurality of shared chunks, wherein The foregoing shared chunk is shared by the foregoing block; if at least one idle chunk is sufficient to store the second sub-stream, the second sub-stream is stored into at least one idle chunk and is corresponding to a specific private block A set of chunk usage information records the number of at least one idle chunk.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
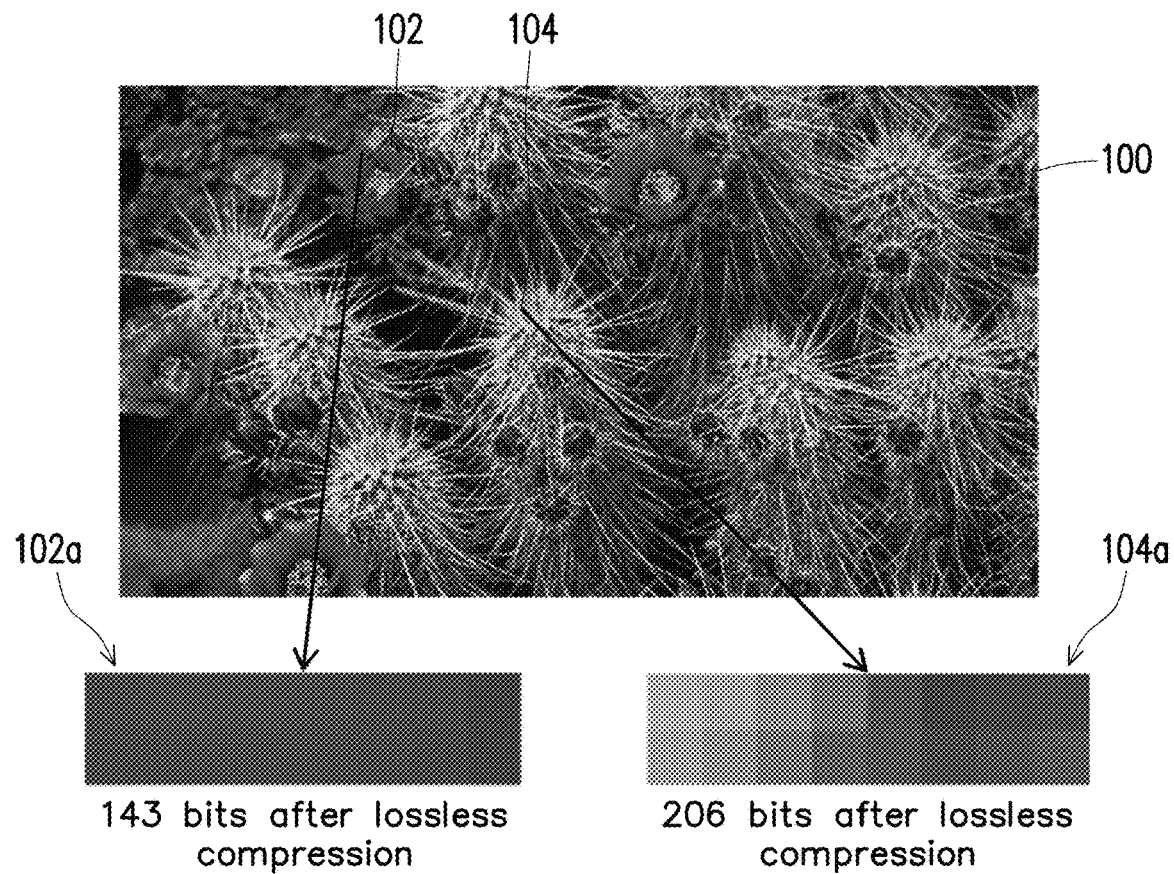
FIG. 1A is a schematic diagram of conventionally compressing two blocks in an image to produce different streams.
Figure 1B:
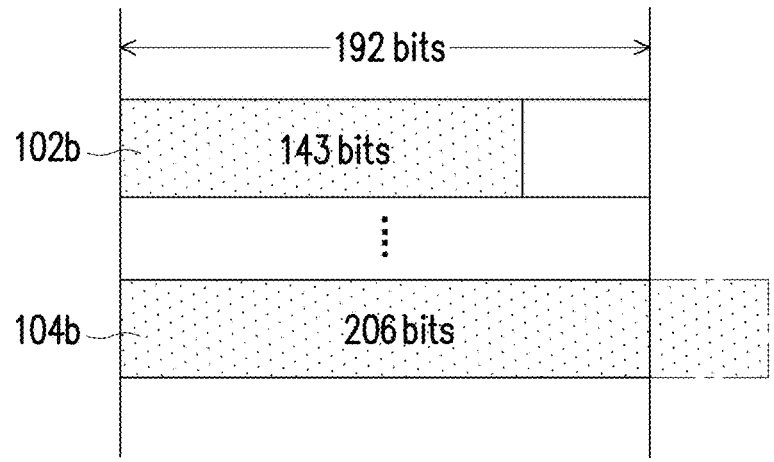
FIG. 1B is a schematic diagram of storing a stream to a compression space according to FIG. 1A.

Reference will now be made in detail to the present preferred embodiments of the disclosure, examples of which are illustrated in the accompanying drawings. Wherever possible, the same reference numbers are used in the drawings and the description to refer to the same or like parts.

Roughly speaking, in the image processing method of the present disclosure, a plurality of blocks belonging to the same block group in a specific image may share a compression space, and the compression space may include multiple private blocks and multiple shared chunks. When the stream generated by compressing one of the above blocks is too long to be completely stored in a private block, the method of the present disclosure may select one or more shared chunks to store the part of the stream that cannot be stored in the private block. Thereby, the compression space corresponding to each block group can be more reasonably arranged, thereby solving the problem of uneven storage space allocation. The details will be described below.

Figure 2:
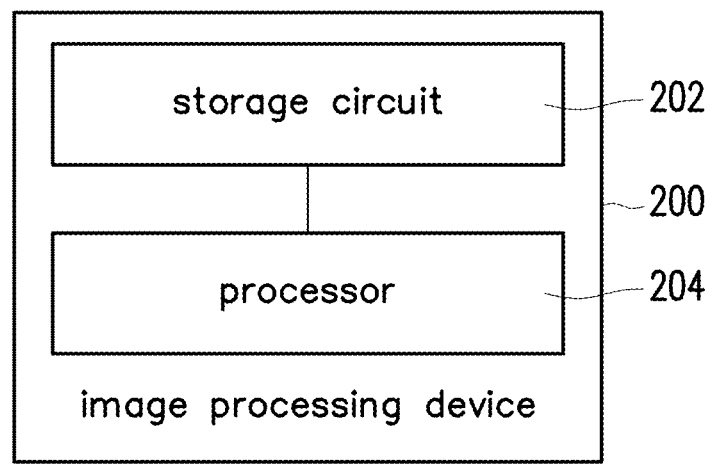
FIG. 2 is an image processing device according to an embodiment of the disclosure.

Please refer to FIG. 2, which is an image processing device according to an embodiment of the disclosure. In FIG. 2, the image processing device 200 may be a mobile phone, a smart phone, a personal computer (PC), a notebook computer (notebook PC), a netbook PC, a tablet PC, a television set, a game console, a portable device, or a portable multimedia player, etc., but the present disclosure is not limited thereto.

As shown in FIG. 2, the image processing device 200 includes a storage circuit 202 and a processor 204. The storage circuit 202 is, for example, any type of fixed or removable random access memory (RAM), read-only memory (ROM), flash memory, a hard disc or other similar device or combination of these devices can be used to record a plurality of code or modules.

The processor 204 is coupled to the storage circuit 202 and can be a general purpose processor, a special purpose processor, a conventional processor, a digital signal processor, a plurality of microprocessors, and one or more microprocessors combined with digital signal processor, controller, microcontroller, application specific integrated circuit (ASIC), field programmable gate array (FPGA), any other kind of integrated circuit, State machine, processor based on Advanced RISC Machine (ARM) and the like.

In an embodiment of the disclosure, the processor 204 can load the codes or modules recorded in the storage circuit 202 to perform the image processing method proposed by the present disclosure, as further described below.

Figure 3:
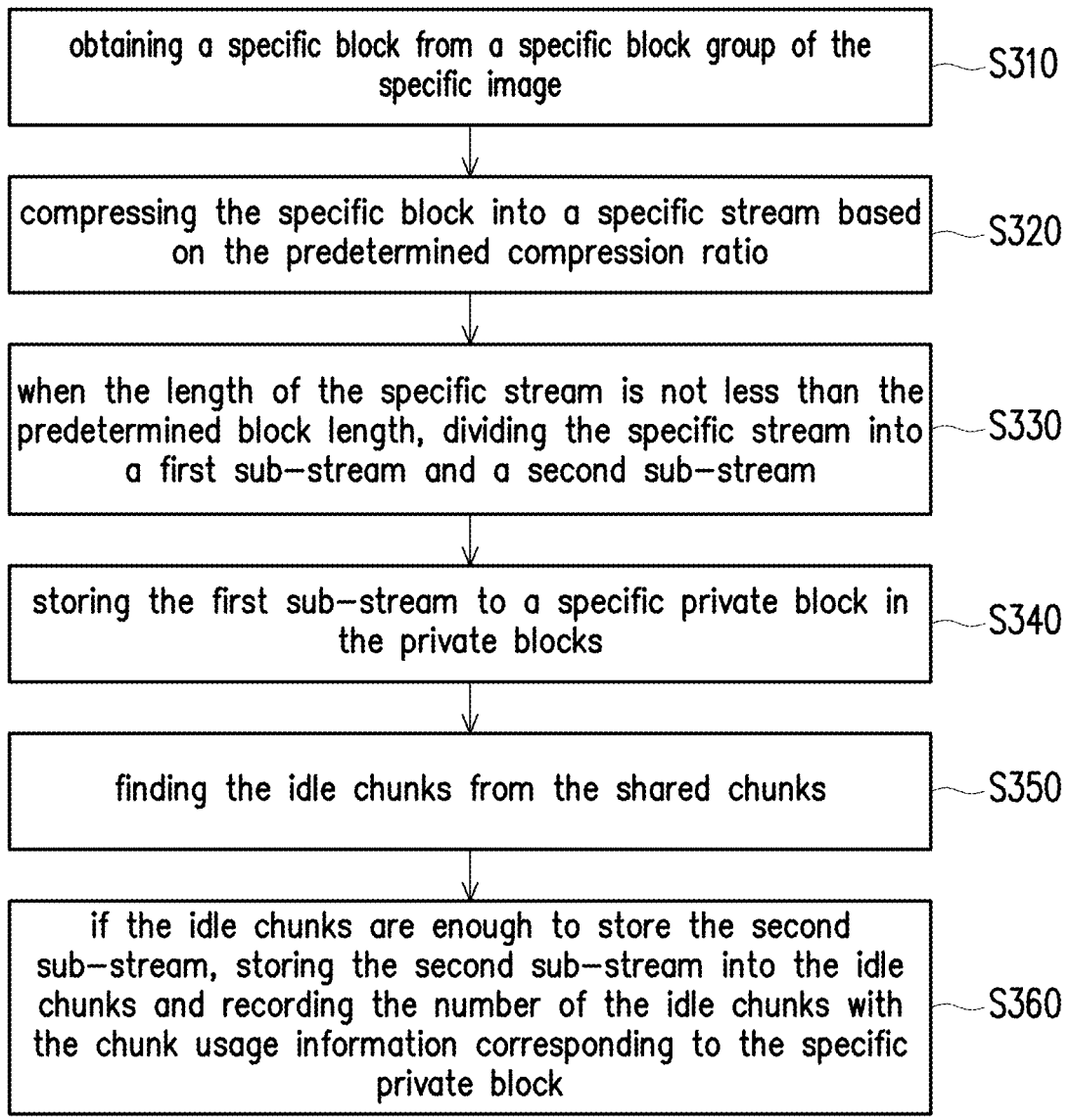
FIG. 3 is a flow chart of an image processing method according to an embodiment of the disclosure.
Figure 4:
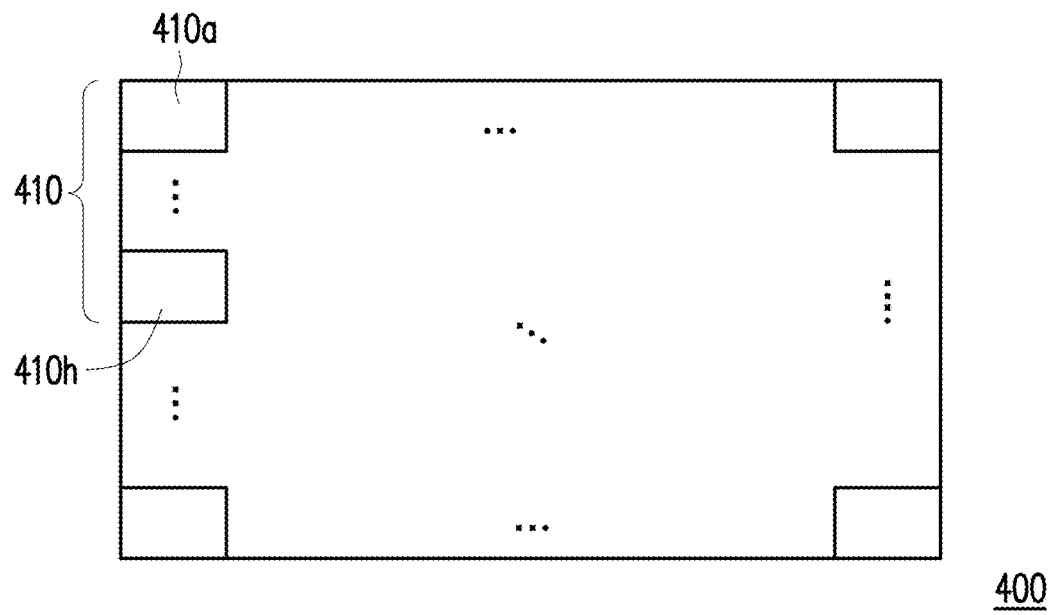
FIG. 4 is a schematic diagram of dividing an image into a plurality of block groups according to FIG.
Figure 5:
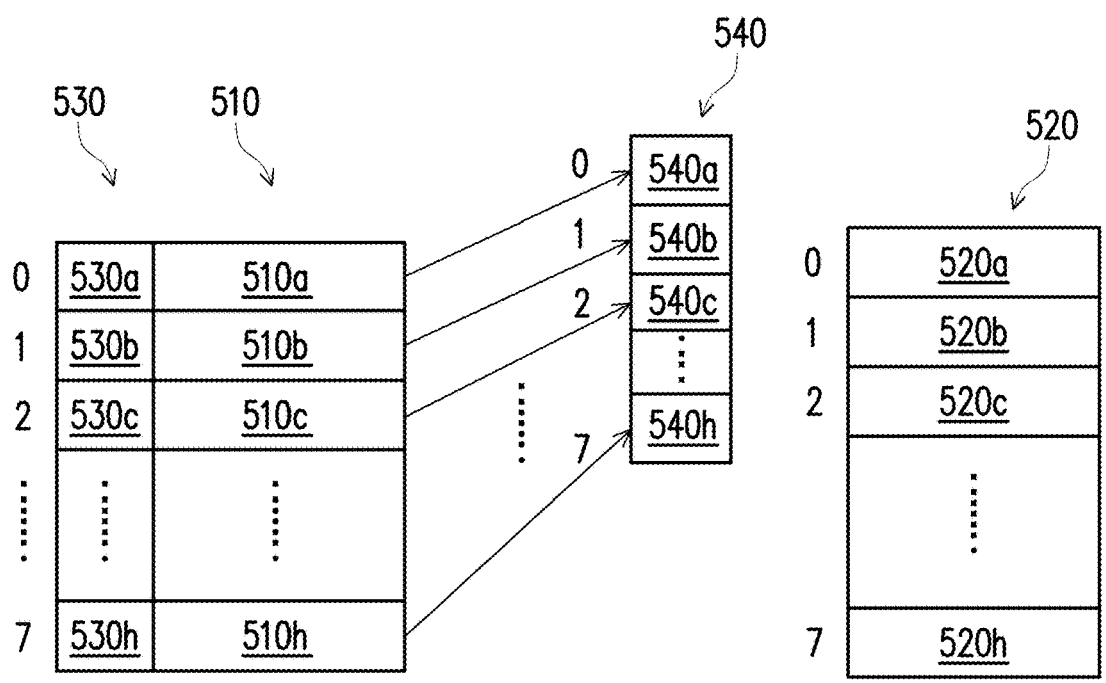
FIG. 5 is a schematic diagram of saving a stream into a compression space according to an embodiment of the disclosure.

Referring to FIG. 3, FIG. 4 and FIG. 5, FIG. 3 is a flowchart of an image processing method according to an embodiment of the disclosure, FIG. 4 is a schematic diagram of dividing an image into a plurality of block groups according to FIG. 3, and FIG. 5 is a schematic diagram of storing a stream into a compression space according to an embodiment of the disclosure. The method of FIG. 3 can be performed by the image processing device of FIG. 2, and the details of the steps in FIG. 3 will be described below with reference to the elements in FIG. 2 and the scenarios shown in FIGS. 4 and 5.

In step S310, the processor 204 may obtain a specific block from a specific block group of the specific image 400. In this embodiment, the specific image 400 can be any image to be compressed, and the processor 204 can divide the specific image 400 into multiple blocks based on the previously mentioned minimum granularity (i.e., 16 pixels), wherein the blocks are exemplified as a plurality of small rectangles in the specific image 400. That is, each block in the specific image 400 can include 16 pixels.

Also, the specific image 400 can be divided into a plurality of specific block groups in units of eight blocks. Taking a specific block group 410 as an example, it may include specific blocks 410a-410h. As mentioned in the previous embodiment, multiple blocks belonging to the same block group will share a compression space. Therefore, under the above assumption, the specific blocks 410a to 410h can share, for example, the compression space 500 shown in FIG. 5.

As shown in FIG. 5, the compression space 500 may include a private space 510, a shared pool 520, a compression algorithm recording space 530, and a chunk usage information recording space 540. The private space 510 may include a plurality of private block 510a, 510b, 510c, . . . , 510h, wherein the length of each of the private blocks 510a-510h is, for example, a predetermined block length, and may correspond to a specific block 410a-410h one-to-one. The shared pool 520 can include shared chunks 520a, 520b, 520c, . . . , 520h. The compression algorithm recording space 530 may include compression algorithm information 530a, 530b, 530c, . . . , 530h. The chunk usage information recording space 540 may include chunk usage information 540a, 540b, 540c, . . . , 540h.

In FIG. 5, the private blocks 510a-510h may correspond one-to-one to the compression algorithm information 530a-530h. At the same time, the compression algorithm information 530a-530h may correspond to the chunk usage information 540a-540h one-to-one. That is, the private blocks 510a-510h may correspond to the chunk usage information 540a-540h one-to-one. Details of each of the private blocks, shared chunks, compression algorithm information, and chunk usage information in the compression space 500 of FIG. 5 will be described in detail later.

To make the concepts of the present disclosure easier to understand, the following description will be based only on a specific block 410a in a specific block group 410. That is, in step S310, the processor 204 may obtain the specific block 410a from the specific block group 410 of the specific image 400.

Thereafter, in step S320, the processor 204 may compress the specific block 410a into a specific stream based on the predetermined compression ratio. For convenience of description, in the present embodiment, the predetermined compression ratio is assumed to be ½, and in other embodiments, the method of the present disclosure is also applicable to other compression ratios, such as ⅓, ¼, etc., but the disclosure is not limited thereto.

In an embodiment, the processor 204 may select a specific compression algorithm capable of guaranteeing the predetermined compression ratio from a plurality of compression algorithms, and compress the specific block 410a into a specific stream based on the specific compression algorithm. The compression algorithms include, for example, a lossless compression algorithm, a mild lossy compression algorithm, a severe lossy compression algorithm, and a forced compression algorithm, but the disclosure is not limited thereto. Moreover, the processor 204 can also record the selected specific compression algorithm in the corresponding binary data in the compression algorithm information 530a corresponding to the specific block 410a.

For example, if the processor 204 selects a lossless compression algorithm, the processor 204 can write "00" in the compression algorithm information 530a. If the processor 204 selects a forced compression algorithm, the processor 204 may write "11" in the compression algorithm information 530a, but the disclosure is not limited thereto.

Next, in step S330, when the length of the specific stream is not less than the predetermined block length, the processor 204 may divide the specific stream into a first sub-stream and a second sub-stream, where the length of the first sub-stream is the same as the predetermined block length. In this embodiment, the predetermined block length is, for example, the length of each of the private blocks 510a to 510h (for example, 158 bits or other lengths preferred by designers).

In step S340, the processor 204 may store the first sub-stream to a specific private block in the private blocks 510a-510h. As described in the previous embodiment, the private blocks 510a-510h may correspond to the specific blocks 410a-410h one-to-one, so the processor 204 may select the private block 510a corresponding to the specific block 410a as the specific private block for storing the first sub-stream. Since the lengths of the first sub-stream and the private block 510a are both equal to the predetermined block length, the first sub-stream can be completely stored in the private block 510a.

In short, if it is determined that the specific stream generated by the compression of the specific block 410a cannot be completely stored in the corresponding private block 510a, the processor 204 can divide the specific stream into the first sub-stream in 510a that can be completely stored in the corresponding private block 510a and the second sub-stream that cannot be stored in private block 510a.

Thereafter, in step S350, the processor 204 can find the idle chunks from the shared chunks 520a-520h. In this embodiment, the idle chunks are the chunks of the shared chunks 520a-520h that are not yet used to store data. Also, the length of each of the shared chunks 520a-520h can be determined by the designer (e.g., 30 bits).

In step S360, if the idle chunks are enough to store the second sub-stream, the processor 204 may store the second sub-stream into the idle chunks and record the number of the idle chunks with the chunk usage information corresponding to the specific private block.

In order to make the concept of the present disclosure clearer, the following detailed description will be further discussed. Moreover, for convenience of description, in the following first, second, third, and fourth embodiments, the predetermined block length will be assumed to be 158 bits, and the length of each shared chunk 520a to 520h will be assumed to be 30 bits. And the length of each chunk usage information 540a-540h will be assumed to be 2 bits, but it is not intended to limit the possible embodiments of the present disclosure.

In the first embodiment, assuming that the specific stream compressed from the specific block 410a has a length of 206 bits, the processor 204 can divide it into the first sub-stream (the length of which is 158 bits (i.e., predetermined block length)) and second sub-stream (the length of which is 48 bits). Thereafter, the processor 204 can completely store the first sub-stream into the private block 510a and find the idle chunk from the shared chunks 520a-520h. Assuming that each of the shared chunks 520a-520h is an idle chunk, the processor 204 can determine that two idle chunks are needed to completely preserve the second sub-stream (the length of which is 48 bits).

Accordingly, the processor 204 can select the shared chunks 520a and 520b as the idle chunks for storing the second sub-stream, wherein the processor 204 can store the first 30 bits of the second sub-stream into the shared chunk 520a and store the last 18 bits of the second sub-stream into the shared chunk 520b.

Since the processor 204 selects two idle chunks to store the second sub-stream, the processor 204 can record the number of idle chunks (i.e., 2) by using the chunk usage information 540a corresponding to the private block 510a (i.e., the specific private block).

In the first embodiment, since the length of the chunk usage information 540a is assumed to be 2 bits, the processor 204 can write "10" in the chunk usage information 540a to characterize the number 2, but the present disclosure is not limited thereto.

In the second embodiment, assuming that the length of the specific stream compressed from the specific block 410a is 150 bits, the processor 204 can directly store the specific stream to the private block 510a. Since processor 204 does not select any idle chunks, processor 204 may record the number of idle chunks (i.e., 0) with chunk usage information 540a corresponding to private block 510a (i.e., the specific private block).

In the second embodiment, the processor 204 may write "00" in the chunk usage information 540a to characterize the number 0, but the present disclosure is not limited thereto.

In the third embodiment, assuming that the specific stream compressed from the specific block 410a has a length of 160 bits, the processor 204 can divide it into the first sub-stream (the length of which is 158 bits (i.e., the predetermined block length) and the second sub-stream (length of which is 2 bits). Thereafter, the processor 204 can find the idle chunks from the shared chunks 520a-520h. Assuming that there are no idle chunks in the shared chunks 520a-520h, the processor 204 can implement a forced compression algorithm on the specific block 410a to compress the specific block 410a into a first stream, wherein the length of the first stream is the same as the predetermined block length. Thereafter, the processor 204 can store the first stream to the private block 510a. Also, since the processor 204 does not select any idle chunks, the processor 204 can set the chunk usage information 540a corresponding to the private block 510a to a quantity of 0 (which can be characterized as "00").

Also, since the processor 204 employs a forced compression algorithm in the third embodiment, the processor 204 can record the forced compression algorithm by using the compression algorithm information 530a corresponding to the private block 510a. For example, the processor 204 may write "11" in the compression algorithm information 530a to characterize the forced compression algorithm information, but the disclosure is not limited thereto.

In the fourth embodiment, assuming that the specific stream compressed from the specific block 410a has a length of 258 bits, the processor 204 can divide it into the first sub-stream (the length of which is 158 bits (i.e., the predetermined block length)) and the second sub-stream (the length of which is 100 bits). Thereafter, the processor 204 can completely store the first sub-stream into the private block 510a and find the idle chunk from the shared chunks

520a-520h. Assuming that the found idle chunks are shared chunks 520b-520h, the processor 204 can determine that four idle chunks are needed to completely preserve the second sub-stream (the length of which is 100 bits).

However, limited by the length of the chunk usage information 540a (i.e., 2 bits), the processor 204 can only select at most 3 idle chunks to store the second sub-stream. Based on this, the processor 204 can implement a forced compression algorithm on the specific block 410a to compress the specific block 410a into the second stream, wherein the length of the second stream is equal to a total length of the private block 510a and the selected idle chunk (for example, 158+90 bits).

Next, the processor 204 may divide the second stream into a first sub-stream component and a second sub-stream component, wherein a length of the first sub-stream component is equal to a length of the private block 510a (i.e., 158 bits), and a length of the second sub-stream component is equal to the length of the selected idle chunks (i.e., 90 bits).

Thereafter, the processor 204 may store the first sub-stream component into the private block 510a and select the shared chunks 520b, 520c, and 520d (not shown) as the idle chunks for storing the second sub-stream component, and store the second sub-stream component in the shared chunks 520b-520d. Since the processor 204 selects three idle chunks to store the second sub-stream component, the processor 204 can record the number of idle chunks (i.e., 3) by using the chunk usage information 540a corresponding to the private block 510a (i.e., the specific private block). In the fourth embodiment, the processor 204 may write "11" in the chunk usage information 540a to characterize the number 3, but the present disclosure is not limited thereto.

Moreover, since the processor 204 employs a forced compression algorithm in the fourth embodiment, the processor 204 can record the forced compression algorithm corresponding to the compression algorithm information 530a of the private block 510a. For example, the processor 204 may write "11" in the compression algorithm information 530a to characterize the forced compression algorithm information, but the disclosure is not limited thereto.

It should be understood that in other embodiments, the designer can set the length of the private block, the shared chunk, the block usage information, and the compression algorithm information according to various requirements.

For example, if the predetermined compression ratio under consideration is ⅓, the lengths of the private block, the shared chunk, the chunk usage information, and the compression algorithm information in FIG. 5 may be set to 100 bits, 24 bits, 2 bits, 2 bits, respectively, but the present disclosure is not limited thereto.

In addition, although the number of shared chunks 520a-520h in FIG. 5 seems to be the same as the number of private blocks 510a-510h, in other embodiments, the designer can also design the number of shared chunks to be different from the number of private blocks as required.

Moreover, although the above teachings are described by taking only the specific block 410a as an example, those skilled in the art should be able to derive the operations performed by the processor 204 on other specific blocks in the specific block group 410. That is, after storing the specific stream generated by compressing the specific block 410a to the compression space 500, the processor 204 may utilize the remaining private blocks, shared chunks, chunk usage information, and compression algorithm information in the compression space 500 to store the specific streams generated by compressing other specific blocks based on the same mechanism.

In an embodiment, after completing the compression process for the specific block 410a, the processor 204 may sequentially perform the step S330-S360 shown in FIG. 3 on the specific blocks 410b-410h to individually store the specific streams generated by compressing the specific blocks 410b-410h into the compression space 500 shared by the specific block group 410.

In addition, the designer can also adjust the positional relationship of the private block, the shared chunk, the block usage information and the compression algorithm information in FIG. 5 according to requirements, and does not have to arrange the private block according to the relative position of the shared chunks, chunk usage information, and compression algorithm information shown in FIG. 5. In an embodiment, the designer may arrange the chunk usage information to locate between the corresponding private blocks and the compression algorithm information. For example, the designer may arrange the chunk usage information 540a to locate between the corresponding private block 510a and the compression algorithm information 530a, and arrange the chunk usage information 540b to locate between the corresponding private block 510b and the compression algorithm information 530b, and so on.

As can be seen from the above, the method provided by the embodiment of the present disclosure may allow a plurality of specific blocks belonging to the same specific block group in a specific image to share a compression space, and the compression space may include multiple private blocks and multiple shared chunks. Each private block may have corresponding chunk usage information and compression algorithm information, which may be used to store the number of selected shared chunks and the corresponding compression algorithm, respectively. When the specific stream generated by compressing one of the specific blocks is too long to be completely stored in a private block, the method of the present disclosure may select one or more shared chunks to store the part of the specific stream that exceeds the private block. Thereby, the compression space corresponding to each specific block group can be more reasonably arranged, thereby solving the problem of uneven storage space allocation.

From another point of view, the concept taught by the above embodiments can be regarded as an image compression mechanism, which can be used to store the specific streams generated by compressing a plurality of specific blocks (of the same specific block group) in the shared compression space.

In view of this, the present disclosure further provides an image decompression mechanism, which can perform a decompression mechanism based on information of a compression space after obtaining it. For convenience of explanation, it will be assumed below that the compression space 500 is the compression space obtained by the processor 204, and the specific stream generated by the compression of the specific blocks 410a-410h has been stored therein. However, in other embodiments, the compression space obtained by the processor 204 may also be edited by other devices, but the present disclosure is not limited thereto.

For a specific private block in the private blocks 510a-510h, the processor 204 may obtain the order of the specific private block in the private blocks 510a-510h and obtain at least one other private block prior to the specific private block. Thereafter, the processor 204 may sum the number recorded by the chunk usage information of each of the other private blocks as a sum value and obtain the chunk usage information of the specific private block. Moreover, the processor 204 can perform a decompression operation associated with the specific private block based on the specific private block and a first part of and the shared chunks 520a-520h, wherein the first part is the (n+1)-th shared chunks to (n+m)-th shared chunks of the shared chunks 520a-520h, where n is the sum value, and m is the number recorded by the chunk usage information of the specific private block.

Moreover, in an embodiment, when the processor 204 performs a decompression operation associated with the specific private block, the processor 204 may obtain a specific compression algorithm recorded by the compression algorithm information corresponding to the specific private block and use a specific decompression algorithm opposite to the specific compression algorithm to perform the decompression operation associated with the specific private block.

In a fifth embodiment, assuming that the private block 510a is a specific private block to be considered by the processor 204, the processor 204 can obtain the order of the private block 510a in the private blocks 510a-510h (for example, the first one of the private blocks 510a-510h). In other words, there are no other private blocks that are sorted before the private block 510a, so the sum value summed by the processors 204 according to the above teachings is 0 (i.e., n is 0).

Assuming that the number recorded in the chunk usage information 540a of the private block 510a is 3 (i.e., m is 3), the processor 204 may obtain the (n+1)-th shared chunk to the (n+m)-th shared chunk (i.e., the first shared chunk to the third shared chunk) of the shared chunks 520a-520h as the first part (i.e., the shared chunks 520a-520c) corresponding to the private block 510a. Accordingly, the processor 204 can perform a decompression operation associated with the private block 510a based on the private block 510a and the shared chunks 520a-520c.

In short, the processor 204 can correspondingly know that the private block 510a and the shared chunks 520a-520c are used to collaboratively store the specific stream compressed from the same specific block (e.g., the specific block 410a) based on the chunk usage information 540a, n, and m. Therefore, the processor 204 can perform a decompression operation based on the private block 510a and the shared chunks 520a to 520c in an attempt to restore the specific block 410a.

In the fifth embodiment, assuming that the specific compression algorithm recorded by the compression algorithm information 530a corresponding to the private block 510a is a lossless compression algorithm, the processor 204 can perform the decompression operation associated with the private block 510a by using a specific decompression algorithm opposite to the lossless compression algorithm.

Thereafter, the processor 204 can continue to assume that the private block 510b next to the private block 510a is the specific private block to be considered by the processor 204. Moreover, the processor 204 can perform a decompression operation associated with the private block 510b based on the private block 510b and its corresponding shared chunks (if any) based on the mechanisms taught above in an attempt to restore the corresponding specific block (e.g., the specific block 410b).

After completing the decompression operation associated with the private block 510b, the processor 204 may sequentially assume that the private blocks 510c-510h are the specific private blocks to considered by processor 204, and perform decompression operations associated with the private block 510c-510h based on the private blocks 510c-510h and their corresponding shared chunks (if any) based on the mechanisms taught above in an attempt to restore the corresponding specific blocks (e.g., the specific blocks 410c-410h). The details thereof will not be described herein.

In summary, the method and device of the embodiments of the present disclosure may allow a plurality of specific blocks belonging to the same specific block group in a specific image to share a compression space, and the compression space may include multiple private blocks and multiple shared chunks. Each private block may have corresponding chunk usage information and compression algorithm information, which may be used to store the number of selected shared chunks and the corresponding compression algorithm, respectively. When the specific stream generated by compressing one of the specific blocks is too long to be completely stored in a private block, the method of the present disclosure may select one or more shared chunks to store the part of the specific stream that exceeds the private block. Thereby, the compression space corresponding to each specific block group can be more reasonably arranged, thereby solving the problem of uneven storage space allocation.

Moreover, in response to the compression space edited by the above image compression mechanism, the present disclosure further proposes a corresponding image decompression mechanism for decompressing data stored in the compression space into an original specific image.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. An image processing method comprising:
obtaining a specific block from a specific block group of a specific image, wherein the specific block group comprises a plurality of blocks;
compressing the specific block into a specific stream based on a predetermined compression ratio;
when a length of the specific stream is not less than a predetermined block length, dividing the specific stream into a first sub-stream and a second sub-stream, wherein a length of the first sub-stream is the same as a length of the predetermined block length;
storing the first sub-stream into a specific private block of a plurality of private blocks;
finding at least one idle chunk from a plurality of shared chunks, wherein the shared chunks are shared by the blocks;
in response to the at least one idle chunk is enough for storing the second sub-stream, storing the second sub-stream into the at least one idle chunk and using a first chunk usage information corresponding to the specific private block to record a number of the at least one idle chunk.

2. The method of claim 1, wherein a length of each of the private blocks is the same as the predetermined block length.

3. The method of claim 1, wherein the private blocks correspond one-to-one to the blocks in the specific block group.

4. The method of claim 1, wherein the step of compressing the specific block into the specific stream based on the predetermined compression ratio comprises:

selecting a specific compression algorithm capable of guaranteeing the predetermined compression ratio from a plurality of compression algorithms, and compressing the specific block into the specific stream based on the specific compression algorithm.

5. The method of claim 4, further comprising:
recording the specific compression algorithm with a first compression algorithm information corresponding to the specific private block.

6. The method of claim 5, wherein the specific private block, the first compression algorithm information, and the first chunk usage information correspond to each other one-to-one.

7. The method of claim 1, wherein when the length of the specific stream is less than the predetermined block length, storing the specific stream to the specific private block and setting the first chunk usage information corresponding to the specific private block to 0.

8. The method of claim 1, wherein when the at least one idle chunk does not exist in the shared chunks, the method further comprises:
performing a forced compression algorithm on the specific block to compress the specific block into a first stream, where a length of the first stream is the same as the predetermined block length;
storing the first stream to the specific private block;
setting the first chunk usage information corresponding to the specific private block to 0;
recording the forced compression algorithm with a first compression algorithm information corresponding to the specific private block.

9. The method of claim 1, wherein in response to the at least one idle chunk is not enough for storing the second sub-stream, the method further comprises:
performing a forced compression algorithm on the specific block to compress the specific block into a second stream, where a length of the second stream is the same as a total length of the specific private block and the at least one idle chunk;
dividing the second stream into a first sub-stream component and a second sub-stream component, wherein a length of the first sub-stream component is equal to a length of the specific private block;
storing the first sub-stream component into the specific private block;
storing the second sub-stream component into the at least one idle chunk;
recording a number of the at least one idle chunk with the first chunk usage information corresponding to the specific private block;
recording the forced compression algorithm with a first compression algorithm information corresponding to the specific private block.

10. The method of claim 1, wherein the at least one idle chunk available for the specific block is limited by a length of the first chunk usage information.

11. The method of claim 1, further comprising:
obtaining an order of the specific private block in the private blocks;
obtaining at least one other private block prior to the specific private block;
summing a number of a chunk usage information of each of the other private block as a sum value;
extracting the first chunk usage information of the specific private block;
performing a decompression operation associated with the specific private block based on the specific private block and a first part of the shared chunks, wherein the first part is the (n+l)-th shared chunks to the (n+m)-th shared chunk, n is the sum value, and m is a number recorded by the first chunk usage information.

12. The method of claim 11, wherein the step of performing the decompression operation associated with the specific private block based on the specific private block and the first part of the shared chunks comprises:
obtaining a specific compression algorithm recorded by a first compression algorithm information corresponding to the specific private block;
performing a decompression operation associated with the specific private block by using a specific decompressing algorithm opposite to the specific compression algorithm.

13. An image processing device comprising:
a storage circuit storing a plurality of modules;
a processor coupled to the storage circuit and accessing the modules to perform the following steps:
obtaining a specific block from a specific block group of a specific image, wherein the specific block group comprises a plurality of blocks;
compressing the specific block into a specific stream based on a predetermined compression ratio;
when a length of the specific stream is not less than a predetermined block length, dividing the specific stream into a first sub-stream and a second sub-stream, wherein a length of the first sub-stream is the same as a length of the predetermined block length;
storing the first sub-stream into a specific private block of a plurality of private blocks;
finding at least one idle chunk from a plurality of shared chunks, wherein the shared chunks are shared by the blocks;
in response to the at least one idle chunk is enough for storing the second sub-stream, storing the second sub-stream into the at least one idle chunk and using a first chunk usage information corresponding to the specific private block to record a number of the at least one idle chunk.

14. The device of claim 13, wherein a length of each of the private blocks is the same as the predetermined block length.

15. The device of claim 13, wherein the private blocks correspond one-to-one to the blocks in the specific block group.

16. The device of claim 13, wherein the processor is configured to:
select a specific compression algorithm capable of guaranteeing the predetermined compression ratio from a plurality of compression algorithms, and compress the specific block into the specific stream based on the specific compression algorithm.

17. The device of claim 16, wherein the processor is further configured to:
record the specific compression algorithm with a first compression algorithm information corresponding to the specific private block.

18. The device of claim 17, wherein the specific private block, the first compression algorithm information, and the first chunk usage information correspond to each other one-to-one.

19. The device of claim 13, when the length of the specific stream is less than the predetermined block length, the processor stores the specific stream to the specific private block and sets the first chunk usage information corresponding to the specific private block to 0.

20. The device of claim 13, wherein when the at least one idle chunk does not exist in the shared chunks, the processor is further configured to:
- perform a forced compression algorithm on the specific block to compress the specific block into a first stream, where a length of the first stream is the same as the predetermined block length;
- store the first stream to the specific private block;
- set the first chunk usage information corresponding to the specific private block to 0;
- record the forced compression algorithm with a first compression algorithm information corresponding to the specific private block.

21. The device of claim 13, wherein in response to the at least one idle chunk is not enough for storing the second sub-stream, the processor is further configured to:
- perform a forced compression algorithm on the specific block to compress the specific block into a second stream, where a length of the second stream is the same as a total length of the specific private block and the at least one idle chunk;
- divide the second stream into a first sub-stream component and a second sub-stream component, wherein a length of the first sub-stream component is equal to a length of the specific private block;
- store the first sub-stream component into the specific private block;
- store the second sub-stream component into the at least one idle chunk;
- record a number of the at least one idle chunk with the first chunk usage information corresponding to the specific private block;
- record the forced compression algorithm with a first compression algorithm information corresponding to the specific private block.

22. The device of claim 13 wherein the at least one idle chunk available for the specific block is limited by a length of the first chunk usage information.

23. The device of claim 13, wherein the processor is further configured to:
- obtain an order of the specific private block in the private blocks;
- obtain at least one other private block prior to the specific private block;
- sum a number of a chunk usage information of each of the other private block as a sum value;
- extract the first chunk usage information of the specific private block;
- perform a decompression operation associated with the specific private block based on the specific private block and a first part of the shared chunks, wherein the first part is the (n+l)-th shared chunks to the (n+m)-th shared chunk, n is the sum value, and m is a number recorded by the first chunk usage information.

24. The device of claim 23, wherein the processor is configured to:
- obtain a specific compression algorithm recorded by a first compression algorithm information corresponding to the specific private block;
- perform a decompression operation associated with the specific private block by using a specific decompressing algorithm opposite to the specific compression algorithm.

* * * * *